United States Patent
Fukumoto

(10) Patent No.: US 7,339,800 B2
(45) Date of Patent: Mar. 4, 2008

(54) SWITCHING POWER SOURCE DEVICE OF RESONANCE TYPE CAPABLE OF CONTROLLING SWITCHING LOSS AND NOISE

(75) Inventor: Yukinari Fukumoto, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 48 days.

(21) Appl. No.: 11/335,378

(22) Filed: Jan. 18, 2006

(65) Prior Publication Data
US 2006/0164872 A1  Jul. 27, 2006

(30) Foreign Application Priority Data
Jan. 21, 2005  (JP) .............................. 2005-014787

(51) Int. Cl.
*H02M 3/335* (2006.01)

(52) U.S. Cl. ...................................... 363/21.02; 363/97

(58) Field of Classification Search ............. 363/21.02, 363/21.04, 21.05, 21.07, 97
See application file for complete search history.

(56) References Cited

U.S. PATENT DOCUMENTS

| | | | |
|---|---|---|---|
| 6,366,476 B1 * | 4/2002 | Yasumura | ................ 363/21.02 |
| 6,366,480 B2 * | 4/2002 | Hosotani et al. | ......... 363/21.14 |
| 6,738,266 B2 * | 5/2004 | Hosotani et al. | ............... 363/16 |
| 6,839,245 B2 * | 1/2005 | Yasumura | ................ 363/21.02 |
| 7,167,384 B2 * | 1/2007 | Yasumura | .................... 363/127 |
| 7,218,534 B2 * | 5/2007 | Yasumura | ................ 363/21.06 |
| 2001/0019489 A1 * | 9/2001 | Hosotani et al. | ............... 363/18 |
| 2003/0142514 A1 * | 7/2003 | Hosotani et al. | ......... 363/21.02 |
| 2005/0068792 A1 * | 3/2005 | Yasumura | ................ 363/21.06 |
| 2006/0037461 A1 * | 2/2006 | Yasumura | .................... 84/730 |
| 2007/0035971 A1 * | 2/2007 | Yasumura | ................ 363/21.02 |

* cited by examiner

*Primary Examiner*—Jeffrey Sterrett
(74) *Attorney, Agent, or Firm*—Bachman & LaPointe, P.C.

(57) ABSTRACT

A switching power source device of resonance type is provided which comprises an output voltage detector 18 for detecting output voltage on a load 13 to produce a detection signal; and a control circuit 2 for applying on-off signals $V_{g1}$, $V_{g2}$ to each control terminal of first and second MOS-FETs 3, 4 in response to the detection signal from the output voltage detector 18. Control circuit 2 comprises a frequency control circuit 23 for controlling the on-off operation of first and second MOS-FETs 3, 4 in response to the level of detection signal from output voltage detector 18 to decide the switching frequency of first and second MOS-FETs 3, 4. Frequency control circuit 23 is provided with an on-time control circuit 21 which more reduces the on-span of one of first and second MOS-FETs 3, 4 during the light load period in response to the level of detection signal from output voltage detector 18 than during the non-light load period to control power consumption, reduce switching loss and noise, and improve switching efficiency in electronics.

8 Claims, 9 Drawing Sheets

SWITCHING POWER SOURCE DEVICE OF RESONANCE TYPE CAPABLE OF CONTROLLING SWITCHING LOSS AND NOISE

TECHNICAL FIELD

This invention relates to a switching power source device of resonance type, in particular, capable of reducing its electric power consumption during the light load condition.

BACKGROUND OF THE INVENTION

As shown in FIG. 1, a prior art switching power source device of resonance type comprises a DC power source 1; first and second MOS-FETs 3 and 4 as first and second switching elements connected in series to DC power source 1; a series circuit which includes a resonance reactor or choke coil 7, a primary winding 9a of a transformer 9 and a capacitor 8 connected in series to each other and to two junctions between first and second MOS-FETs 3 and 4 and between second MOS-FET 4 and power source 1; a rectifying smoother 17 connected to secondary windings 9b and 9c of transformer 9 to supply DC power to a load 13; an output voltage detector 18 for detecting an output voltage applied on load 13; and a control circuit 2 for applying on-off signals $V_{g1}$, $V_{g2}$ to each control or gate terminal of first and second MOS-FETs 3 and 4. A voltage resonance capacitor 6 is connected in parallel to second MOS-FET 4. Parasitic diodes 3a and 4a are connected between drain and source terminals of first and second MOS-FETs 3 and 4.

Secondary windings 9b and 9c of transformer 9 comprise a first secondary winding 9b; a second secondary winding 9c connected in series to first secondary winding 9b. Each distal end of first and second secondary windings 9b and 9c is connected to a positive terminal of load 13 through respectively diodes 10 and 11. Each mesial end of first and second secondary windings 9b and 9c is connected to a center tap to a negative terminal of load 13 which is connected in parallel to a smoothing capacitor 12. Also, connected between both terminals of load 13 is an output voltage detector 18 which comprises an error amplifier 14, a normal power supply 15 for providing a reference voltage for an inverted input terminal of error amplifier 14, and a photo-coupler 16 driven by an output from error amplifier 14. Non-inverted terminal of error amplifier 14 is connected to positive terminal of load 13, and output terminal of error amplifier 14 is connected to an anode terminal of a light emitting diode (light emitter) 16a of photocoupler 16 whose cathode terminal is connected to negative terminal of load 13. Positive and negative terminals of normal power supply 15 are connected to inverted terminal of error amplifier 14 and negative terminal of load 13. A light receiving or photo-transistor (light receiver) 16b of photocoupler 16 receives a light from light emitting diode 16a, and both terminals of photo-transistor 16b are connected to associated input terminals 2a and 2b of control circuit 2. Both terminals of a regulatory capacitor 30 are connected to control terminals 2c and 2d of control circuit 2 to adjust a resonance frequency.

FIGS. 2 and 3 indicate voltage and current waveforms at selected locations in the circuit shown in FIG. 1 during the light and full load periods. FIG. 4 shows voltage and current waveforms occurring for long cycles wherein symbols $V_{g1}$ and $V_{g2}$ denote respectively time charts of switching or drive signals applied to control or gate terminals of first and second MOS-FETs 3 and 4. Switching signals from control circuit 2 are intermittent pulse signals which each involves a constant dead time.

In operation of the switching power source device shown in FIG. 1, when control circuit 2 forwards a drive signal $V_{g1}$ to gate terminal of first MOS-FET 3 while second MOS-FET 4 is in the off-condition, first MOS-FET 3 is turned on so that resonant current $I_1$ flows from power source 1 through first MOS-FET 3, resonance reactor 7, primary winding 9a of transformer 9 and resonance capacitor 8 for resonance of reactor 7 and capacitor 8, thereby causing resonance current $I_1$ to increase voltage applied on primary winding 9a of transformer 9.

Resonance current $I_1$ produces and increases an induced voltage applied on first secondary winding 9b of transformer 9. When induced voltage is elevated up to a threshold level of DC output voltage $V_{OUT}$, it is clamped with DC output voltage level $V_{OUT}$ to generate through rectifying diode 10 an output current which charges output smoothing capacitor 12 and at the same time supplies DC electric power to load 13. Then, voltage on primary winding 9a starts to decease, thereby lowering induced voltage on first secondary winding 9b. When induced voltage drops below threshold level of DC output voltage $V_{OUT}$, no electric power is supplied to the secondary side of transformer 9 so that resonance current $I_1$ flows through first MOS-FET 3, resonance reactor 7, primary winding 9a and resonance capacitor 8 with low frequency determined by resonance reactor 7, primary winding 9a and resonance capacitor 8 to accumulate energy in resonance reactor 7, primary winding 9a and resonance capacitor 8. Symbol $V_{C2}$ denotes a voltage across resonance capacitor 8.

Subsequently, when first MOS-FET 3 is turned off, voltage resonance appears on voltage resonance capacitor 6 by a serial circuit which comprises resonance reactor 7, primary winding 9a and resonance capacitor 8 plus voltage resonance capacitor 6. Applied voltage $V_{C1}$ across voltage resonance capacitor 6 varies through a part of voltage resonance sine waveform between power source voltage $V_{IN}$ and ground level, thereby likewise varying voltages applied on secondary windings 9b and 9c. When voltage $V_{C1}$ across voltage resonance capacitor 6 is lowered from power source voltage $V_{IN}$ to ground level, but before comes to negative voltage, parasitic diode 4a of second MOS-FET 4 becomes conductive to clamp voltage $V_{C1}$ across voltage resonance capacitor 6 at ground level so that resonance current $I_2$ flows through the primary circuit of transformer 9 for resonance by reactor 7 and capacitor 8. During the conductive period of parasitic diode 4a, namely during the clamped period of voltage $V_{C1}$ across voltage resonance capacitor 6 at ground level, more specifically during the zero voltage period of second MOS-FET 4, switching signal $V_{g2}$ is applied to gate terminal of second MOS-FET 4 to turn second MOS-FET 4 on for zero voltage switching.

While second MOS-FET 4 is turned on after voltage applied on secondary windings 9b and 9c of transformer is changed for polarity inversion, secondary current flows from second secondary winding 9c of transformer 9 through parallel rectifying diode 11 to charge output smoothing capacitor 12 and supply DC electric power to load 13. When voltage across second secondary winding 9c drops and comes below threshold of DC output voltage $V_{OUT}$, power supply to secondary side of transformer 9 ceases. On the other hand, primary side of transformer 9 provides a current resonance circuit of resonance reactor 7, primary winding 9a, resonance capacitor 8 and second MOS-FET 4 to cause current resonance with its low frequency and thereby accumulate energy in resonance reactor 7, primary winding 9a and resonance capacitor 8.

After that, when second MOS-FET 4 is turned off under the off-condition of first MOS-FET 3, voltage resonance occurs on capacitor 6 by series circuit of resonance reactor 7, primary winding 9a and resonance capacitor 8 plus voltage resonance capacitor 6 so that voltage resonance causes voltage $V_{C1}$ across capacitor 6 to increase from ground level toward power source voltage $V_{IN}$ along a part of voltage resonance sine waveform. Simultaneously, voltage on secondary windings 9b and 9c similarly changes. When voltage $V_{C1}$ reaches power source voltage $V_{IN}$, parasitic diode 3a of first MOS-FET 3 becomes conductive to clamp voltage $V_{C1}$ at the power source voltage $V_{IN}$. When a switching signal $V_{g1}$ is applied to gate terminal of first MOS-FET 3 during the clamped period of voltage $V_{C1}$ and the conductive period of parasitic diode 3a, namely during the zero voltage period of first MOS-FET 3, it is turned on for zero voltage switching.

Repetition of the foregoing operation causes first and second MOS-FETs 3 and 4 to be alternately turned on and off with the duty ratio of approximately 50%.

Output voltage detector 18 picks out DC output voltage $V_{OUT}$ supplied to load 13 to produce a detection signal to control circuit 2 through photocoupler 16. Error amplifier 14 compares output voltage $V_{OUT}$ to load 13 with reference voltage from normal power supply 15 to produce error signal, the difference between output voltage $V_{OUT}$ and reference voltage. Accordingly, with higher output voltage $V_{OUT}$ than reference voltage, error amplifier 14 generates greater output current transmitted through photocoupler 16 to control circuit 2 which provides switching signals of narrower on-pulse to first and second MOS-FETs 3 and 4. Adversely, with lower output voltage $V_{OUT}$ than reference voltage, error amplifier 14 generates smaller output current transmitted through photocoupler 16 to control circuit 2 which provides switching signals of wider on-pulse to first and second MOS-FETs 3 and 4. In this way, control circuit 2 serves to control and adjust output voltage $V_{OUT}$ toward a constant level. The embodiment shown in FIG. 1 can utilize switching signals $V_{g1}$ and $V_{g2}$ inclusive of a constant dead time and of variable on-span of switching signal for switching frequency control. Such a switching power source device of resonance type can reduce and heighten the switching frequency respectively during the full and light load periods as shown in FIG. 5. To this end, control circuit 2 modulates pulse frequency (PFM, Pulse Frequency Modulation) of switching signals $V_{g1}$ and $V_{g2}$ to gate terminals of first and second MOS-FETs 3 and 4 in response to detection signals from output voltage detector 18 to control the on-off operation of first and second MOS-FETs 3 and 4 in order to stabilize DC output voltage $V_{OUT}$.

FIG. 6 exhibits an example of control circuit 2 wherein control terminal 2a connects a first current regulator 31b of a charging circuit 31 with photo-transistor 16. A positive terminal of first current regulator 31b is connected to DC power source through a first switch 31a, and a negative terminal of first current regulator 31b is connected to a junction. A discharging circuit 32 comprises a second switch 32a and a second current regulator 32b connected in series to each other between a junction and ground. Also, a junction is connected to regulatory capacitor 30 through control terminal 2c and to one input terminal of a comparator 33 which has the hysteretic characteristics capable of producing two thresholds $V_H$ and $V_L$ of high and low voltage levels. An output terminal of comparator 33 is connected to an inverter 34 and second switch 32a through b junction. An output terminal of inverter 34 is connected to T input terminal of a T flip flop (TFF) 35, first switch 31a and each one input terminal of AND gates 36 and 37. A Q output terminal of TFF 35 is connected to the other input terminal of AND gate 36, and a Q bar output terminal of TFF 35 is connected to the other input terminal of AND gate 37. Output terminals of AND gates 36 and 37 are connected respectively to each one input terminal of AND gates 40 and 41. Each of the other input terminals of AND gates 40 and 41 is connected to an output terminal of error amplifier 42 which has a non-inverted input terminal connected to a junction of a capacitor 44 and a resistor 48, and an inverted input terminal connected to a normal power supply 43 for generating a reference voltage. A series circuit of resistor 43 and capacitor 44 is connected between DC power source and ground.

In operation of control circuit 2, when inverter 34 produces its output of high voltage level, first switch 31a of charging circuit 31 is turned on to charge regulatory capacitor 30 by charge current flowing through first switch 31a and first current regulator 31b. Charged level of regulatory capacitor 30 determines the switching rate of TFF 35, namely resonance frequency of current $I_1$ flowing resonance capacitor 8, first current regulator 31b produces a controlled constant current value to provide charge time constant for regulatory capacitor 30, and photo-transistor 16b controls the value of current passing through current regulator 31b. When regulatory capacitor 30 is charged up to high voltage threshold $V_H$ from comparator 33, comparator 33 changes the output to high voltage level which triggers to turn second switch 32a on, and therefore, discharge current flows from regulatory capacitor 30 through second switch 32a and second current regulator 32b to discharge regulatory capacitor 30, while concurrently inverter 34 produces its output of low voltage level to turn off charging circuit 31 and AND gate 36. Second current regulator 32b provides discharge time constant of discharge current running therethrough. When regulatory capacitor 30 is discharged to low voltage threshold $V_L$ from comparator 33 which then changes the output to low voltage level, second switch 32a is turned off, and at the same time, first switch 31 is turned on. In this way, comparator 33 alternately changes the output between high and low voltage levels in response to charged and discharged levels of regulatory capacitor 30, repeating these operations.

Comparator 33 produces its output which is then inverted by inverter 34, and TFF 35 alternately switches the output level from Q and Q bar output terminals each time rising edge of inverted signals from inverter 34 is supplied to T input terminal of TFF 35. In detail, when inverter 34 offers a first high voltage level signal to T input terminal, TFF 35 produces the output from Q output terminal in response to first high voltage level signal from inverter 34 without producing the output from Q bar output terminal. Therefore, receiving the output from Q terminal of TFF 35 and the signal from inverter 34, AND gate 36 is turned on to produce the output to AND gate 40 which provides switching signal $V_{g1}$ to first MOS-FET 3 when error amplifier 42 generates the output of high voltage level.

Afterward, when inverter 34 has changed the output to low voltage level, AND gate 36 shifts to switch the output signal to low voltage level to provide a dead time period. Then, when inverter 34 again produces the output of high voltage level, TFF 35 changes the output from Q terminal to low voltage level, and simultaneously the output from Q bar terminal to high voltage level. Thereby, AND gates 36 and 37 change their outputs respectively to low and high voltage levels, so AND gate 41 produces the output of high voltage level to give second MOS-FET 4 a switching signal $V_{g2}$. After that, when inverter 34 changes the output to low voltage level, AND gate 37 shifts the output to low voltage level to provide a dead time period. Thus, AND gates 36 and 37 serve to add a dead time to each of switching signals $V_{g1}$ and $V_{g2}$ for first and second MOS-FETs 3 and 4.

Charge and discharge voltages on regulatory capacitor 30 form the triangular waveform with time course, and during the increasing ramp period of charge voltage on regulatory capacitor 30, either of first and second MOS-FETs 3 and 4 is in the on-condition, and during the decreasing ramp period of discharge voltage on regulatory capacitor 30, both of first and second MOS-FETs 3 and 4 are in the off-condition.

Controlling current flow passing through first and second current regulators 31b and 32b enables adjustment of respectively current charge and discharge amount or rate to and from regulatory capacitor 30.

As mentioned above, resonant switching power source device for frequency control requires adjustment of output power by increasing oscillation frequency during the light load period to stabilize the output voltage to a constant level, thereby causing switching elements to make them operate with the high switching frequency. This results in increase in switching energy loss by control circuit or MOS-FETs as switching elements, and therefore the power source device is disadvantageous in that it has the lower energy conversion efficiency during the light load period than those of switching power sources of other type for driving switching elements with unchanged frequency. To resolve this problem, Japanese Patent Disclosure No. 8-130871 proposes a switching power source device. As shown in FIG. 6, the disclosed device has an additional input terminal 61 connected to non-inverted input terminal of error amplifier 42, capacitor 44 and resistor 48 to apply switching signals to additional input terminal 61 so that both of two switching elements for high and low sides are coincidentally turned off to provide the pause periods between two pulses of voltage $V_{C1}$ shown in FIG. 7 and intermittent operation for switching elements.

This device, however, is still defective in that it incurs the switching loss and noise during the non-resonance or dissonance operation resulted from the pause period.

An object of the present invention is to provide a switching power source device capable of controlling switching loss and noise by reducing or preventing non-resonance operation at the time of lowered switching frequency to thereby improve energy conversion efficiency during the light load period.

SUMMARY OF THE INVENTION

The switching power source device of resonance type according to the present invention comprises: a DC power source (1); first and second switching elements (3, 4) connected in series to DC power source (1); a primary winding (9a) of a transformer (9) connected in parallel to one of first and second switching elements (3, 4); a resonance capacitor (8) for forming a series circuit together with primary winding (9a) of transformer (9); a rectifying smoother (7) connected to a second winding (9b, 9c) of transformer (9) for supplying DC power to a load (13); an output voltage detector (18) for detecting output voltage on load (13) to produce a detection signal; and a control circuit (2) for applying on-off signals ($V_{g1}$, $V_{g2}$) to each control terminal of first and second switching elements (3, 4) in response to the detection signal from the output voltage detector (18). Control circuit (2) comprises a frequency control circuit (23) for controlling the on-off operation of first and second switching elements (3, 4) in response to the level of detection signal from output voltage detector (18) to decide the switching frequency. Frequency control circuit (23) is provided with a conduction or on-time control circuit (21) which more reduces the on-span of one of first and second switching elements (3, 4) during the light load period in response to the level of detection signal from output voltage detector (18) than during the non-light load period to control power consumption, reduce switching loss and noise, and improve switching efficiency in electronics. Conversely, this causes the on-span of the other of first and second switching elements (3, 4) to extend while reducing the switching frequency to control power loss resulted from switching loss of first and second switching elements (3, 4). Also, first and second switching elements (3, 4) can be turned on or off at the time of zero voltage between their main terminals for soft switching to reduce noise.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Figure 1:
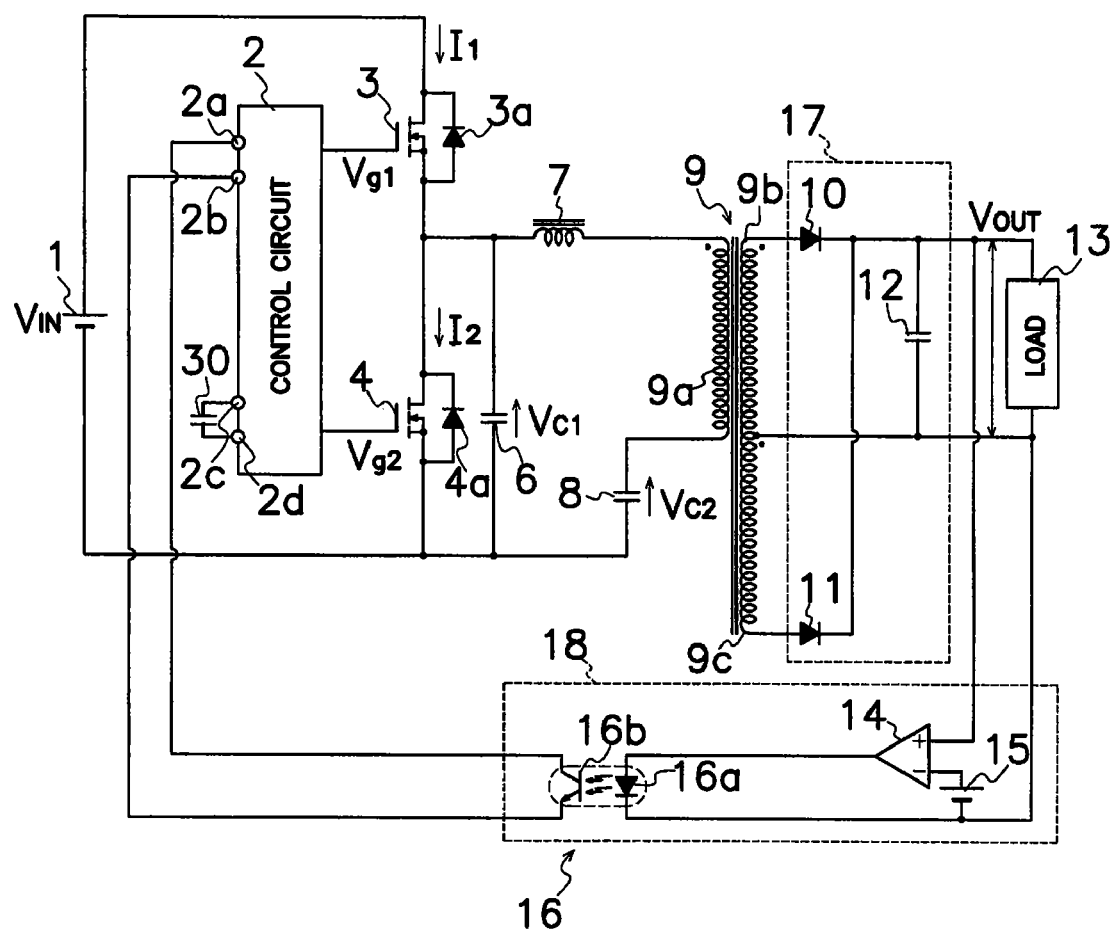
FIG. 1 is an electric circuit diagram of a prior art switching power source of resonance type.
Figure 2:
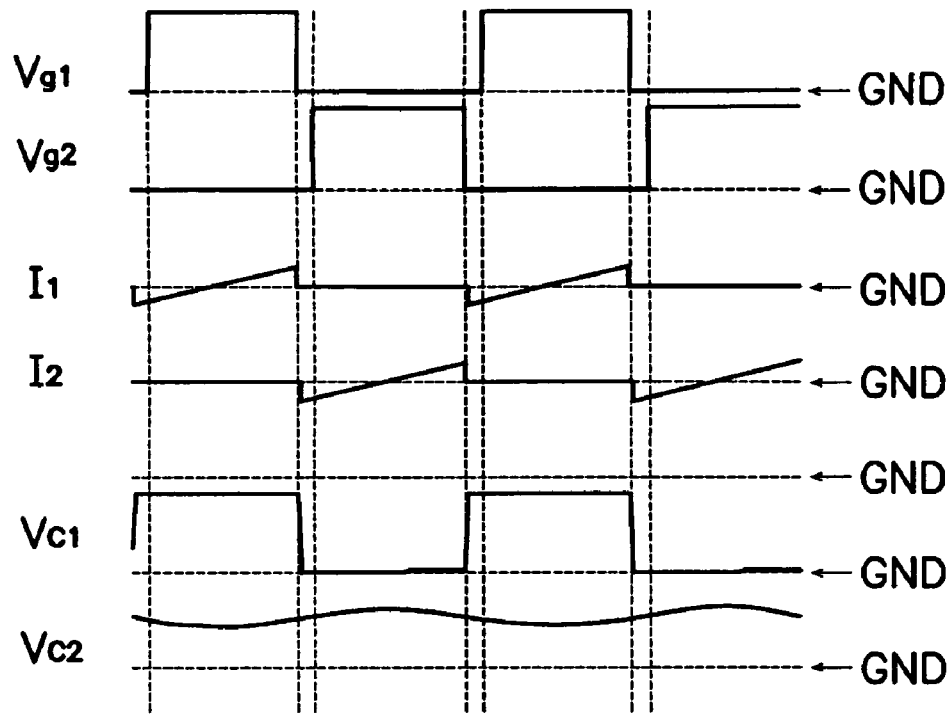
FIG. 2 shows a time chart indicating varying waveforms of voltages and currents during the light load period at selected locations in the electric circuit shown in FIG. 1 which includes a control circuit shown in FIG. 6.
Figure 8:
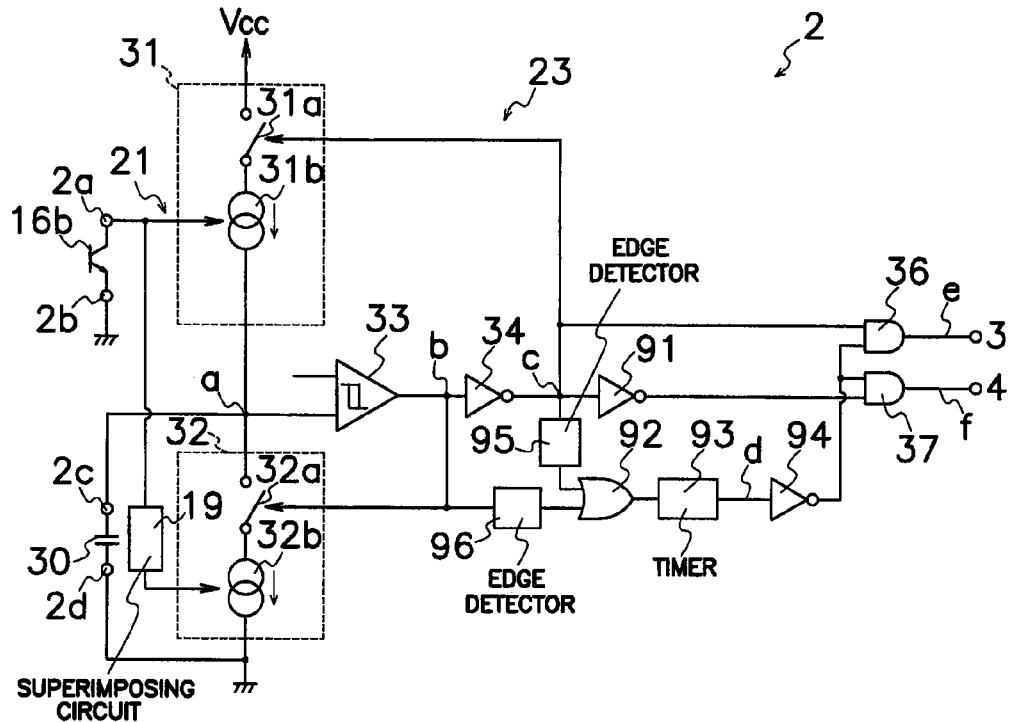
FIG. 8 is an electric circuit diagram of a control circuit of the switching power source of resonance type according to the present invention.

Embodiments of the switching power source device of resonance type according to the present invention will be described hereinafter in connection with FIGS. 8 to 16 of the drawings. Same reference symbols as those shown in FIGS. 1 and 8 are applied to similar portions in these drawings, omitting explanation therefor. A general and basic circuit of the switching power source device of resonance type according to the present invention is similar to that shown in FIG. 1.

As shown in FIG. 8, the control circuit 2 according to an embodiment of the present invention, comprises a frequency control circuit 23 for controlling the on-off operation of first MOS-FET (high side switching element) 3 and second MOS-FET (low side switching element) 4 in response to the level of detection signal from output voltage detector 18 to decide the switching frequency. Frequency control circuit 23 comprises a regulatory capacitor 30, and a conduction or on-time control circuit 21 for controlling charge current into and discharge current from regulatory capacitor 30. On-time control circuit 21 comprises charging and discharging circuits 31 and 32 for respectively charging and discharging regulatory capacitor 30.

A first current regulator 31b of charging circuit 31 is connected to photo-transistor 16b through control terminal 2a of control circuit 2. First current regulator 31b has a positive terminal connected to DC power source through first switch 31a, and a negative terminal connected to a junction. Discharging circuit 32 comprises a second switch 32a and a second current regulator 32b connected in series between a junction and ground. Also, a junction is connected to regulatory capacitor 30 through control terminal 2c and to one input terminal of comparator 33 of hysteretic characteristics. An output terminal of comparator 33 is connected to a first inverter 34 through b junction, and to a second switch 32a and an OR gate 92 through an edge detector 96. An output terminal of first inverter 34 is connected each input terminal of a second final stage inverter 91, first switch 31a, AND gate 36 and OR gate 92 through edge detector 95. An output terminal of inverter 91 is connected to an input terminal of an AND gate 37, and an output terminal of OR gate 92 is connected to each input terminal of AND gates 36 and 37 through a timer 93 and a third final stage inverter 94. By way of an example, timer 93 preferably includes a one-shot multi-vibrator for producing an output to third inverter 94 when a predetermined period of time has passed after timer 93 received a leading edge of rising pulse signal from comparator 33 or first inverter 34. In other words, the predetermined period of time between points from receiving the input signal to producing the output signal by timer 93 provides a dead time for keeping both of first and second MOS-FETs 3 and 4 off. Each output terminal of first and second AND gates 36 and 37 are connected respectively to gate terminals of first and second MOS-FETs 3 and 4. When charged voltage in regulatory capacitor 30 comes to high level threshold $V_H$ of comparator 33 which then changes the output signal to high voltage level, discharging circuit 32 is turned on for discharge of accumulated electric charge in regulatory capacitor 30, adversely, when charged voltage in regulatory capacitor 30 falls to low level threshold $V_L$ of comparator 33 which then changes the output signal to low voltage level, discharging circuit 32 is turned off and simultaneously charging circuit 31 is turned on.

In operation of control circuit 2, third inverter 94 delivers the output of high voltage level to AND gate 36 when the predetermined period of time has passed after first inverter 34 produced the output of high voltage level, and therefore, first MOS-FET 3 is turned on by virtue of a switching signal $V_{g1}$ from AND gate 36. At this moment, as second inverter 91 produces the output of low voltage level, AND gate 37 is kept in the off-condition not to turn on second MOS-FET 4. At the same time, Output of high voltage level from first inverter 34 turns first switch 31a of charging circuit 31 on to cause current flow to pass through first switch 31a and first current regulator 31b into regulatory capacitor 30 for its charge.

When voltage on charged regulatory capacitor 30 reaches high level threshold $V_H$ of comparator 33, it charges the output to high voltage level to convert the output of first inverter 34 into low voltage level, thereby turning off first switch 31a of charging circuit 31. Concomitantly, AND gate 36 changes the output to low voltage level to turn first MOS-FET 3 off, while trailing edge of the output from first inverter 34 triggers timer 93 to start a dead time to keep both of first and second MOS-FETs 3 and 4 in the off-condition for a predetermined period of time. On the other hand, the output of high voltage level from comparator 33 turns second switch 32a of discharging circuit 32 on to pass discharge current from regulatory capacitor 30 through second switch 32a and second current regulator 32b. Also, as first inverter 34 produces the output of low voltage level, second inverter 91 produces the output of high voltage level. Accordingly, AND gate 37 changes the output to high voltage level after expiration of dead time to turn second MOS-FET 4 on.

Figure 11:
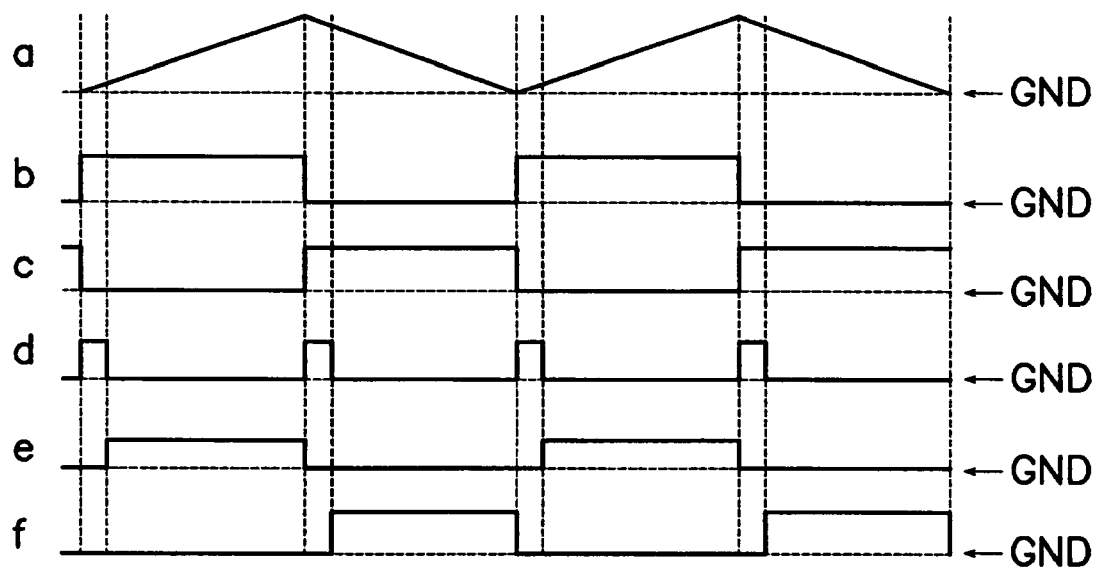
FIG. 11 is a time chart indicating current waveforms at selected locations in the circuit shown in FIG. 8 during the non-light load period.

When regulatory capacitor 30 is discharged to low level threshold $V_L$ of comparator 33, it changes the output to low voltage level; first inverter 34 changes the output to high voltage level; second inverter 91 changes the output to low voltage level, AND gate 37 produces the output of low voltage level; second MOS-FET 4 is turned off; concurrently trailing edge of the output from comparator 33 activates timer 93 to start the dead time during which both of first and second MOS-FETs 3 and 4 are maintained in the off-condition for the dead time. The output of low voltage level from comparator 33 turns second switch 32a of discharging circuit 32 off and first switch 31a of charging circuit 31 on. As the output of low voltage level from comparator 33 causes first inverter 34 to produce the output of high voltage level, AND gate 36 produces the output of high voltage level after expiration of dead time to turn first MOS-FET 3 on and second MOS-FET 4 off. Thus, charge and discharge levels of regulatory capacitor 30 can alternate the output from comparator 33 between high and low voltage levels, and these actions are repeated after that. As shown in FIG. 11, charged voltage of regulatory capacitor 30, namely voltage at location a indicates rectangular waveforms with time course, and therefore, during the charged period of regulatory capacitor 30, first MOS-FET 3 is turned on after expiration of dead time, while second MOS-FET 4 is kept off, to the contrary, during the discharged period of regulatory capacitor 30, second MOS-FET 4 is turned on while first MOS-FET 3 is kept off.

Figure 9:
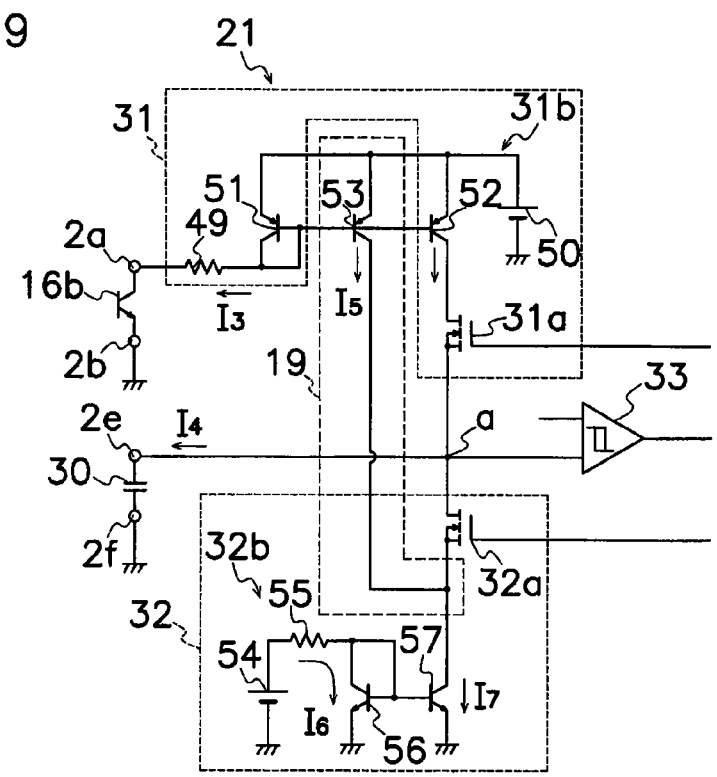
FIG. 9 is an electric circuit diagram of a control circuit which comprises a charge control circuit, discharge control circuit and superimposing circuit.
Figure 10:
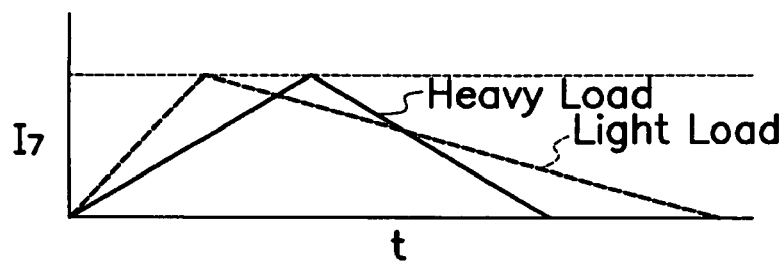
FIG. 10 is a graph indicating a change in charge and discharge times of regulatory capacitor.

FIG. 9 reifies an example of on-time control circuit 21. Charging circuit 31 forms a current mirror circuit for supplying electric current to regulatory capacitor 30 from an electrifying DC power source 50 in response to the amount of current flowing through voltage detector 18. Charging circuit 31 comprises leading and charging transistors 51 and 52, and leading transistor 51 comprises an emitter terminal connected to power source 50; collector and base terminals both connected to collector terminal of photo-transistor 16b through a resistor 49. Incorporated with leading transistor 51 to form a first current mirror circuit, is charging transistor 52 which comprises an emitter terminal connected to power source 50 and a collector terminal connected to discharging circuit 32. FIG. 9 shows a different electric structure and position of first and second switches 31a and 32a from those shown in FIG. 8, however, they perform substantially same functions to each other.

Discharging circuit 32 comprises a restrictive transistor 56 which has a collector terminal connected to a discharging DC power source 54 through a resistor 55, and a discharging transistor 57 incorporated with restrictive transistor 56 to form a second current mirror circuit. A collector terminal of discharging transistor 57 is connected to collector terminal of charging transistor 52 through MOS-FETs 31a and 32a as first and second switches of charging and discharging circuits 31 and 32. Positioned between regulatory capacitor 30 and input terminal of comparator 33 is a junction which is further connected to MOS-FET 31a of charging circuit 31 and MOS-FET 32a of discharging circuit 32. Each emitter terminal of restrictive and discharging transistors 56 and 57 is connected to ground.

On-time control circuit 21 further comprises an intervenient transistor 53 which comprises a base terminal connected to each base terminal of leading and charging transistors 51 and 52, an emitter terminal connected to power source 50 and a collector terminal connected to collector terminal of discharging transistor 57 to form a superimposing circuit 19.

In operation, when a switching signal is supplied to gate terminal of MOS-FET 31a which is therefore turned on, a detection current $I_3$ flows from DC power source 50 through leading transistor 51 and resistor 49 and photo-transistor 16b of output voltage detector 18, and in this case, the inherent feature of current mirror circuit allows a charge current flow $I_4$ to run through charging transistor 52 and a supplementary current $I_5$ to run through intervenient transistor 53 with detection, charging and supplementary currents $I_3$, $I_4$ and $I_5$ of equivalent amount to each other. Charging current $I_4$ through charging transistor 52 charges regulatory capacitor 30. With increase of detection current $I_3$ during the on-condition of MOS-FET 31a, charging and supplementary currents $I_4$ and $I_5$ also simultaneously augment, and therefore increase of charge current $I_4$ can shorten charge time of regulatory capacitor 30, while, at the same time, multiplying supplementary current $I_5$ through intervenient transistor 53.

Thereafter, when MOS-FET 31a is turned off while MOS-FET 32a is turned on, discharge current $I_7$ flows from regulatory capacitor 30 through discharging transistor 57. When detection current $I_3$ increases during the light load period, supplementary current $I_5$ through intervenient transistor 53 similarly increases so that supplementary current $I_5$ is merged with discharge current $I_7$ from regulatory capacitor 30 into a confluent current through discharging transistor 57. A reference current $I_6$ of only a given amount flows from DC power source 54 through discharging transistor 57 which therefore allows only passage therethrough of current in a constant amount. Accordingly, when supplementary current $I_5$ increases in confluent current, discharge current $I_7$ relatively decreases, thereby causing second current mirror circuit to extend discharge time of regulatory capacitor 30 as understood from FIG. 10.

Superimposing circuit 19 connects charging and discharging circuits 31 and 32 to merge or combine supplementary current $I_5$ with discharge current $I_7$ through discharging circuit 32 for retardation in discharge of regulatory capacitor 30. Charging circuit 31 serves to increase charge current $I_4$ to regulatory capacitor 30 during the light load period in order to shorten charge time of regulatory capacitor 30 so that on-time control circuit 21 more reduces the on-period or on-span of first MOS-FET 3 than it does during the non-light load period such as heavy or full load period. In this way, discharging circuit 32 reduces discharge current during the light load period to extend discharge time of regulatory capacitor 30, and thereby on-time control circuit 21 more widens the on-span of second MOS-FET 4 than it does during the non-light load period. Discharge current flowing from regulatory capacitor 30 through discharging circuit 32 may be expressed as a function of charge current to regulatory capacitor 30 so that discharge current decreases with increase in charge current.

In this embodiment, on-time control circuit 21 can more reduce the on-span of first MOS-FET 3 during the light load condition based on the level of detection signal from output voltage detector 18 than it does during the non-light load condition to control the output power. Conversely, this extends the on-span of second MOS-FET 4 to lower the switching frequency and control power loss resulted from switching energy loss of first and second MOS-FETs 3 and 4. As the extended on-period time length of second MOS-FET 4 is longer than the reduced on-period time length of first MOS-FET 3, switching frequency of first and second MOS-FETs 3 and 4 can be reduced.

Figure 12:
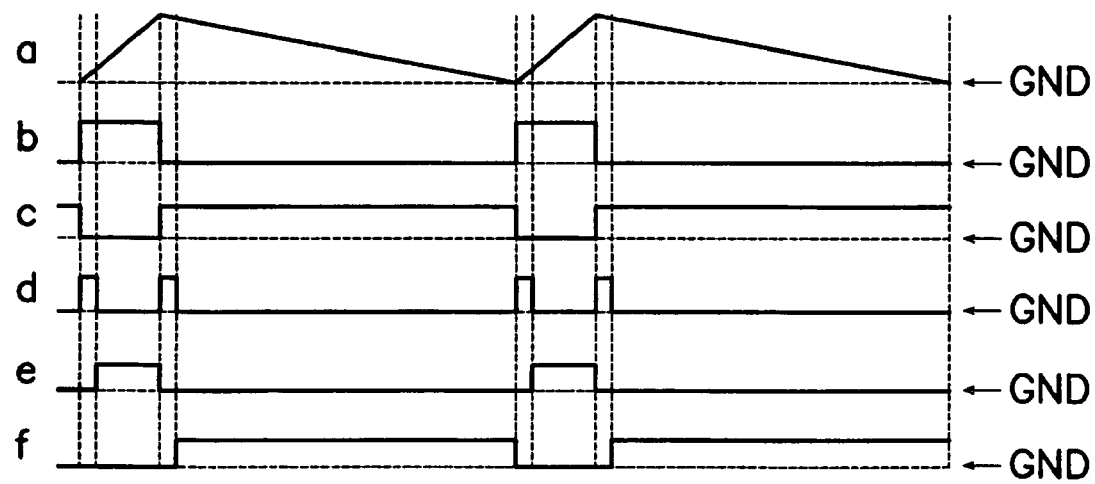
FIG. 12 is a time chart indicating current waveforms at selected locations in the circuit shown in FIG. 8 during the light load period.
Figure 13:
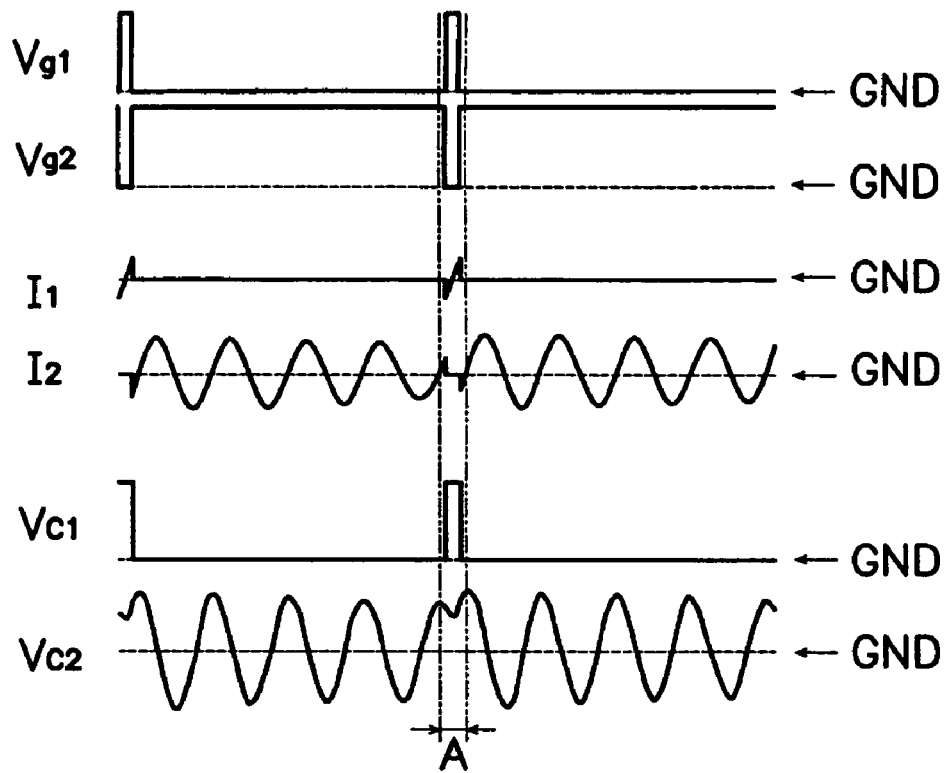
FIG. 13 is a time chart indicating current and voltage waveforms at selected locations in the circuit of switching power source device shown in FIG. 3 with the control circuit shown in FIG. 8.
Figure 14:
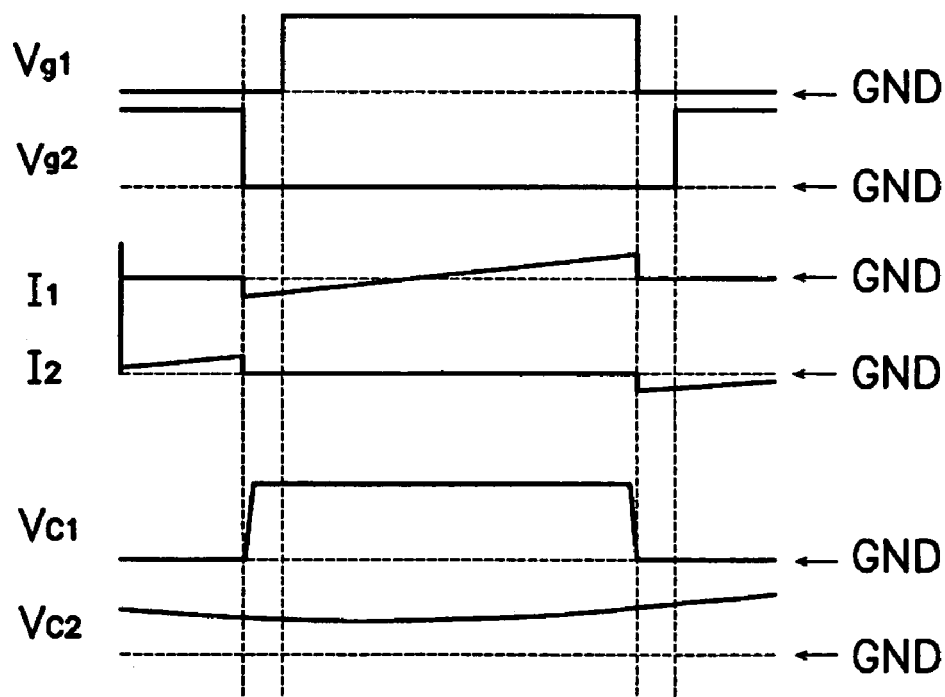
FIG. 14 is an enlarged diagram of a portion A shown in FIG. 13.

FIGS. 11 and 12 show waveforms at selected locations a to f in on-time control circuit 21 shown in FIG. 8 during the non-light load and light load periods. Locations a, b, c, d, e and f indicate respectively time charts of voltage on regulatory capacitor 30, output from comparator 33, output from inverter 34, output from timer 93, switching signals to gate terminals of first and second MOS-FETs 3 and 4. Switching signals are intermittent pulse signals each involving a constant dead time. FIG. 13 shows waveforms at selected locations of the switching power source device shown in FIG. 1 utilizing on-time control circuit 21. When switching signals $V_{g1}$, $V_{g2}$ shown in FIG. 13 are applied to gate terminals of first and second MOS-FETs 3 and 4, electric currents $I_1$ and $I_2$ flowing respectively through first and second MOS-FETs 3 and 4. These waveforms of electric currents $I_1$ and $I_2$ indicate resonance currents which resonate with the natural frequency determined by resonance reactor 7 and capacitor 8. During the resonance, rising and trailing edges of voltage $V_{C1}$ waveform across second MOS-FET 4 indicate a part of voltage resonance waveforms mainly resulted from voltage resonance capacitor 6 and primary winding 9a of transformer 9. FIG. 14 is an enlarged view of A area in waveforms shown in FIG. 13.

Figure 3:
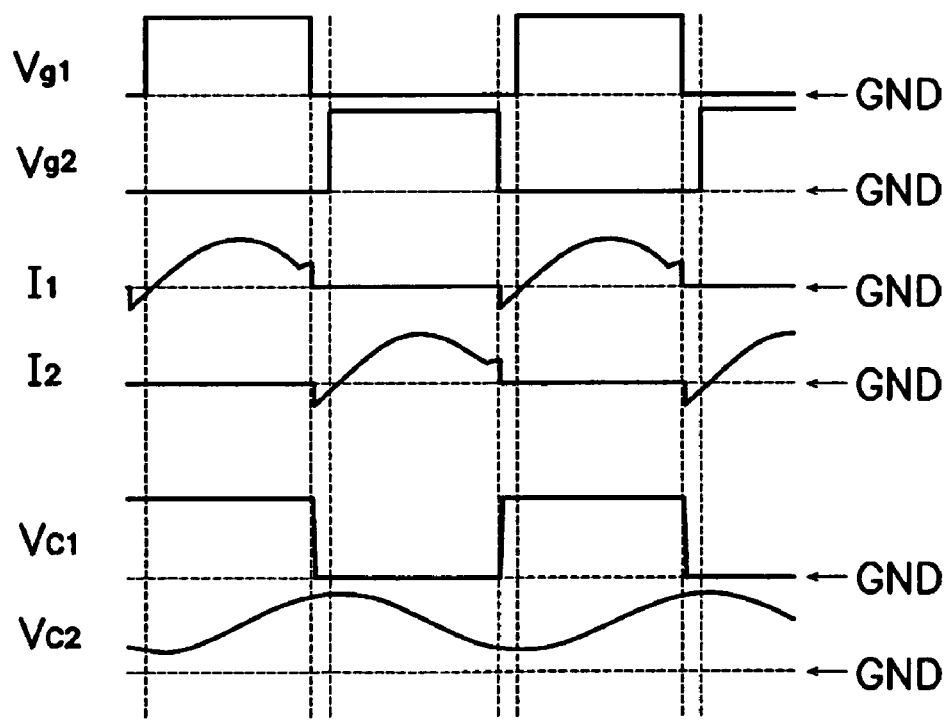
FIG. 3 shows a time chart indicating varying waveforms of voltages and currents during the non-light load period at selected locations in the electric circuit shown in FIG. 1 which includes a control circuit shown in FIG. 6.
Figure 4:
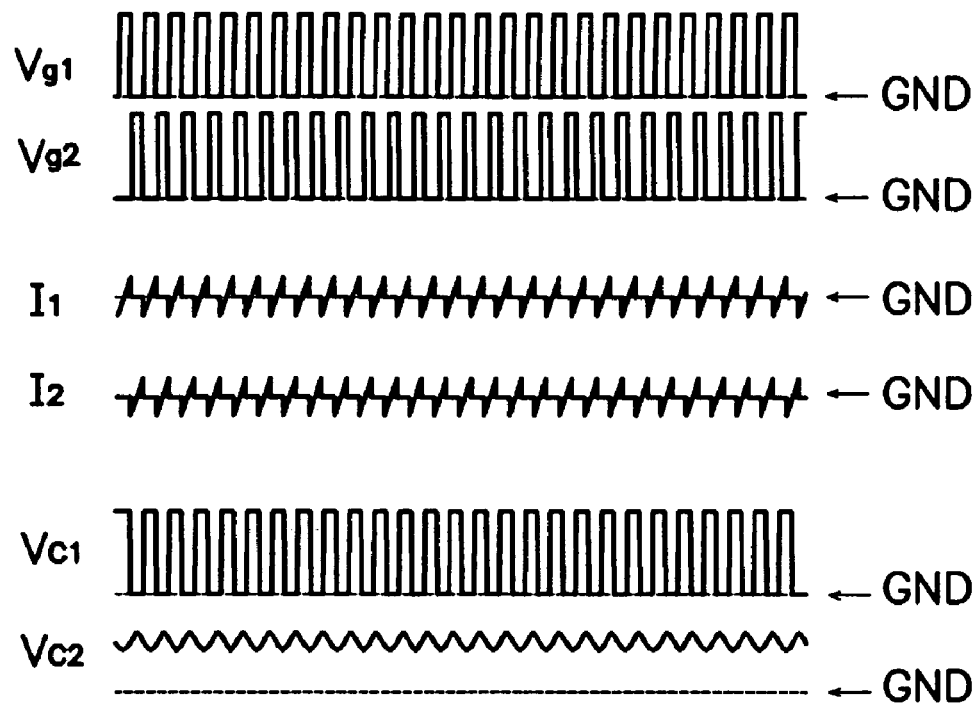
FIG. 4 is a time chart for long cycles of the time chart shown in FIG. 2.
Figure 5:
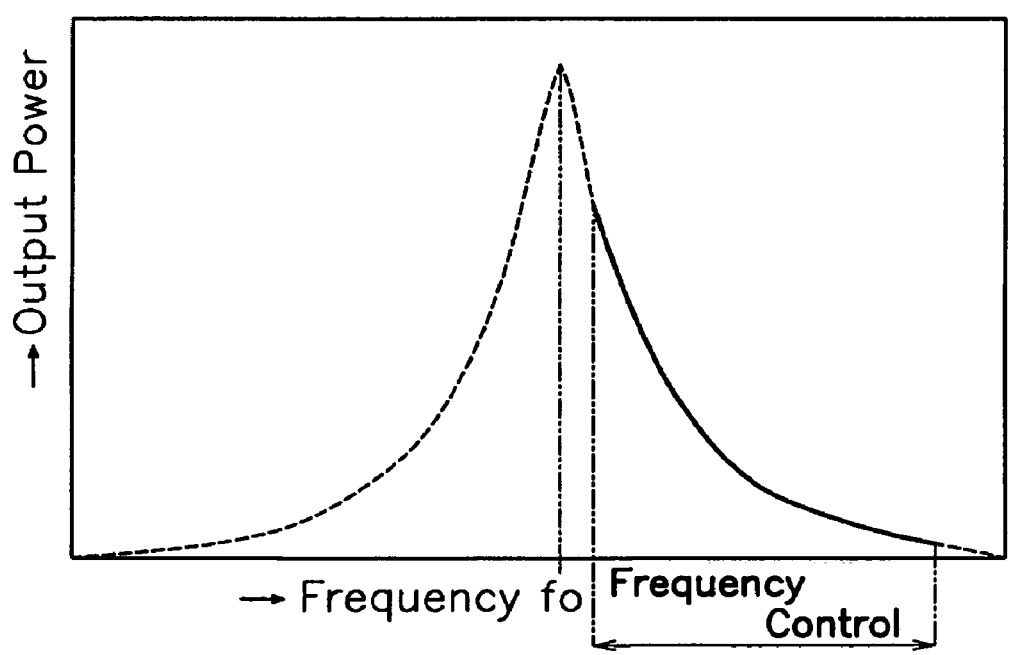
FIG. 5 is a graph showing a relationship of the output power to a load with switching frequency in a prior art switching power source device of resonance type.
Figure 6:
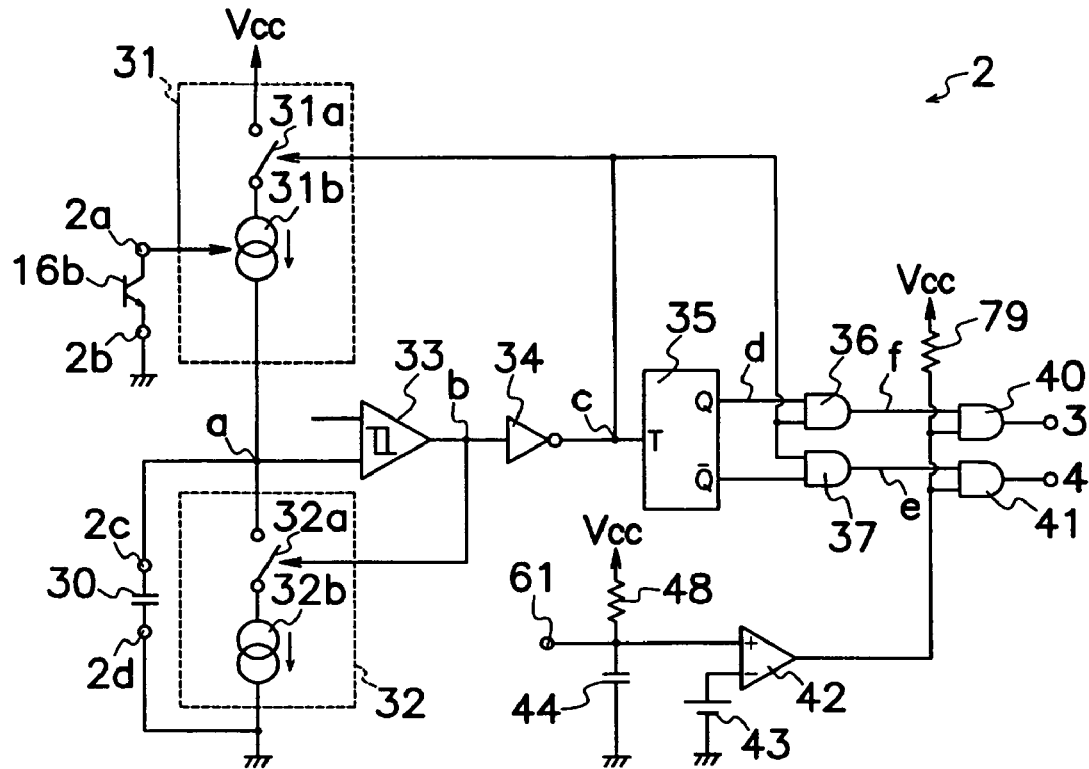
FIG. 6 is an electric circuit diagram of a control circuit used in prior art switching power source of resonance type.
Figure 7:
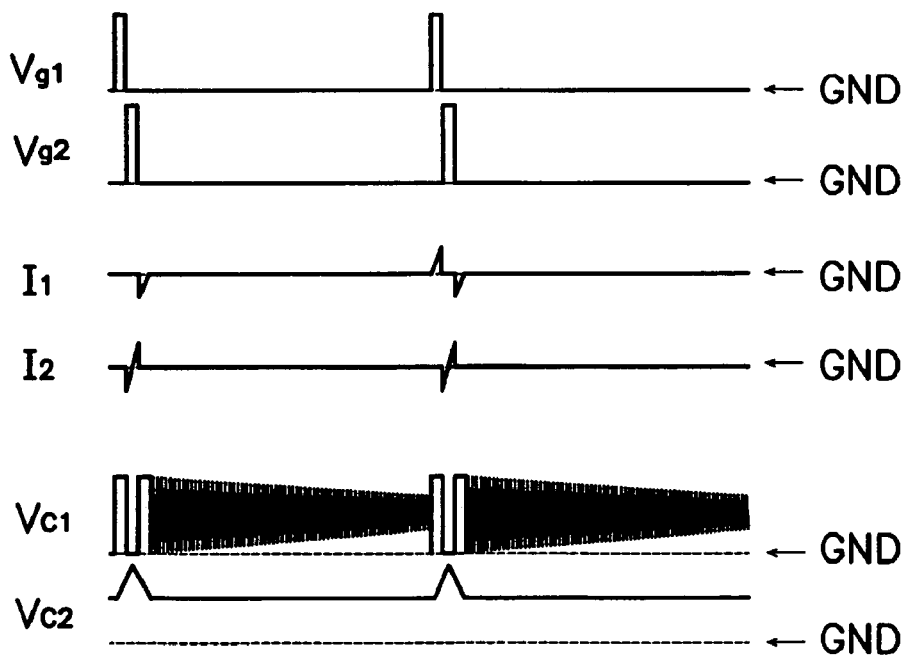
FIG. 7 is a time chart indicating waveforms of voltages and currents at selected locations in the electric circuit of a switching power source device of resonance type shown in Japanese Patent Disclosure No. 8-130871 during the light load period.

As understood from FIG. 11(a), frequency control circuit 23 controls the on-periods of first and second MOS-FETs 3 and 4 to a substantially same time length during the full load period (non-light load period) because charge and discharge times of regulatory capacitor 30 are substantially same. On the contrary, during the light load condition, frequency control circuit 23 gains a frequency control to perform asymmetrical adjustment in the on-period of first and second MOS-FETs 3 and 4 as shown in FIG. 12(a). In detail, FIG. 13 graphs narrowed on-span of first MOS-FET 3 and widened on-span of second MOS-FET 4 during the light load period because frequency control circuit 23 controls first and second MOS-FETs 3 and 4 to cause the on-span of second MOS-FET 4 to become longer than a cycle of resonance frequency of resonance reactor 7 and capacitor 8. During the full load period, electric current $I_2$ passing through second MOS-FET 4 turned on varies approximately synchronously with resonance frequency cycles as shown in FIG. 3 similarly to prior art switching power source device, whereas during the light load period shown in FIG. 13, electric current $I_2$ indicates the resonance frequency of four cycles in one cycle of switching frequency due to the resonance of reactor 7, primary winding 9a and capacitor 8. Accordingly, in this embodiment, it will be apparent that, during the light load period, switching frequency of first and second MOS-FETs 3 and 4 is relatively reduced further below approximately one forth of resonance frequency during the full load period.

When electric currents $I_1$ and $I_2$ flowing through first and second MOS-FETs 3 and 4 exceed a value necessary for voltage resonance during the light load period, first and second MOS-FETs 3 and 4 can be turned off from the on-condition for the soft switching with reduced noise. For instance, in the present embodiment, when resonance current flowing through second MOS-FET 4, reactor 7, primary winding 9a and capacitor 8 exceeds a reference value $V_{ref}$ of resonance current, second MOS-FET 4 in the on-condition can be turned off to accomplish the zero voltage switching (ZVS). When a dead time for promoting voltage resonance after second MOS-FET 4 is turned off, is over, first MOS-FET 3 is turned on to move on to a next cycle, and zero voltage switching (ZVS) can be attained when switching from the off to the on-condition.

Figure 15:
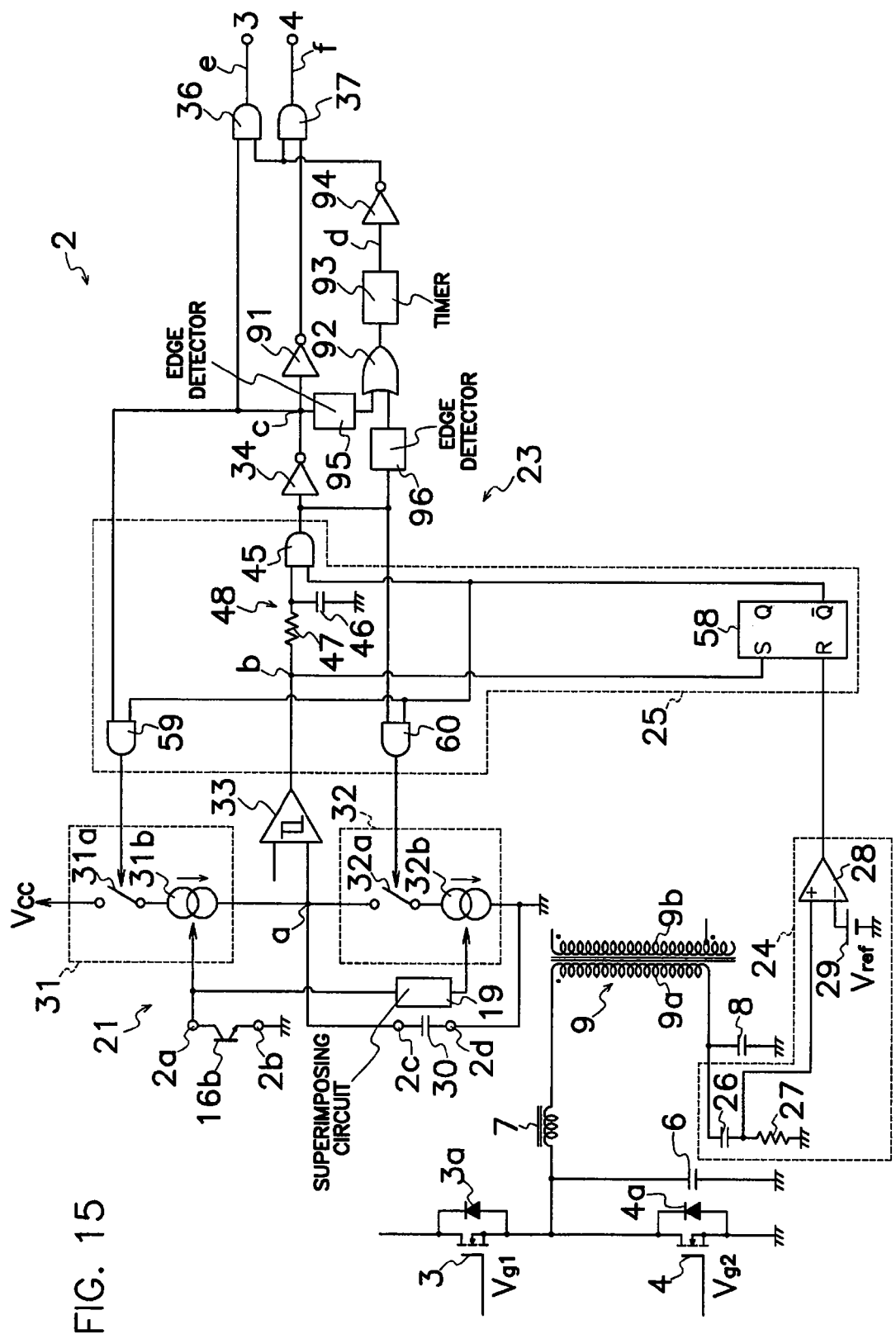
FIG. 15 is a circuit diagram of a control circuit according to another embodiment of the present invention.
Figure 16:
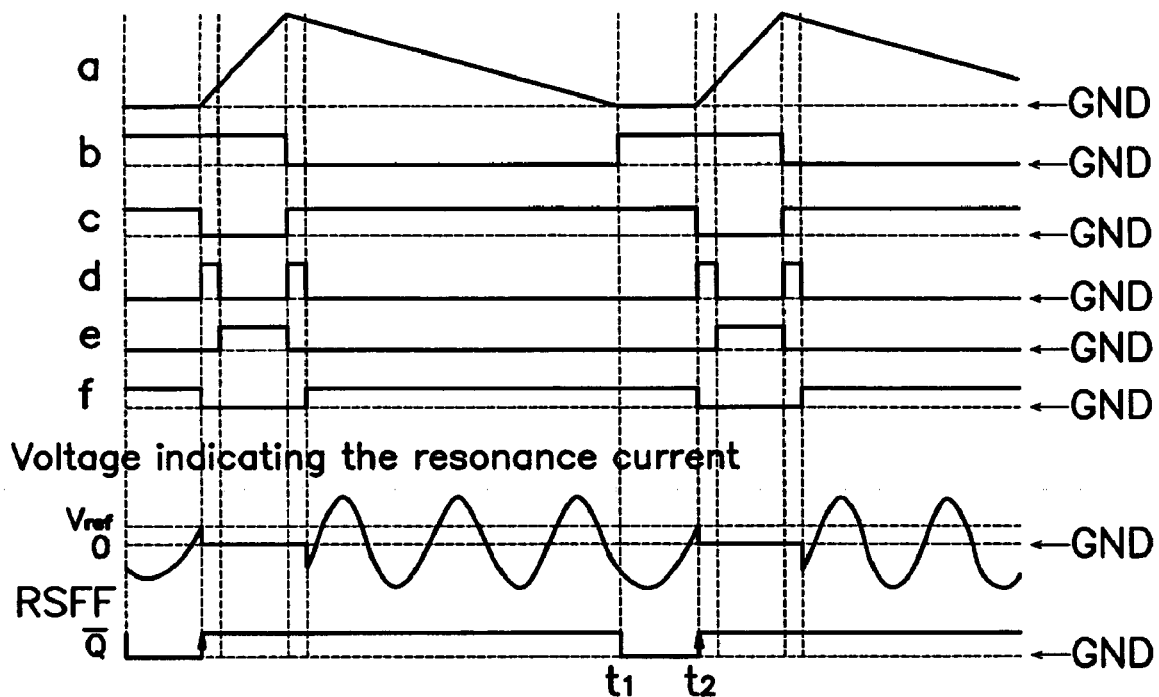
FIG. 16 is a time chart indicating current waveforms at selected locations in the circuit shown in FIG. 15 during the light load period.

The foregoing embodiment does not necessarily require coincidence or simultaneity of alternating frequency for charging and discharging regulatory capacitor 30 and resonance frequency of alternating current $I_2$ flowing through second MOS-FET 4. Control circuit 2 shown in FIG. 15 illustrates another embodiment of the present invention for solving the problem of the off-resonance arisen in the previous embodiment to achieve the accurate resonance. Frequency control circuit 23 shown in FIG. 15 comprises a primary current detector 24 for detecting resonance current flowing through primary winding 9a of transformer 9 to produce a detection signal; and a time control circuit 25 for controlling charge and discharge time for regulatory capacitor 30 in response to detection signal from primary current detector 24. Primary current detector 24 catches the point of time that resonance current determined by reactor 7, primary winding 9a and capacitor 8 comes up to a predetermined current value. Time control circuit 25 comprises an RS flip flop (RSFF) 58 as a retaining circuit for maintaining a charged condition of regulatory capacitor 30 at a predetermined voltage level to determine resonance frequency; a noise filter 48; and an AND gate 45 which has one input terminal S for receiving an output from comparator 33 through noise filter 48 and the other input terminal for receiving an output from Q bar output terminal of RSFF 58 to produce the output to first inverter 34. Time control circuit 25 further comprises a first AND gate 59 which has two input terminals connected to Q bar terminal of RSFF 58 and output terminal of first inverter 34, and an output terminal connected to first switch 31a; and a second AND gate 60 which has two input terminals connected to Q bar terminal of RSFF 58 and output terminal of AND gate 45, and an output terminal connected to second switch 32a. Therefore, first and second switches 31a and 32a of control circuit 2 are kept in the off-condition when RSFF 58 develops no output from Q bar terminal.

Primary current detector 24 comprises a series circuit of a capacitor 26 and a resistor 27 connected between ground and a junction of primary winding 9a of transformer 9 and resonance capacitor 8; and a comparator 28 which has a non-inverted input terminal connected to a junction between capacitor 26 and resistor 27, and an inverted terminal connected to a normal power source 29 for producing a reference voltage $V_{ref}$. An output terminal of comparator 28 is connected to a reset terminal R of RSFF 58, and a set terminal S of RSFF 58 is connected to output terminal of comparator 33. Noise filter 48 comprises a resistor 47 connected between output terminal of comparator 33 and input terminal of AND gate 45; and a capacitor 46 connected between ground and a junction of resistor 47 and AND gate 45 to remove or attenuate undesirable sharp pulse or noise with delay of output from comparator 33 to AND gate 45.

In operation, resistor 27 converts electric current flowing through resonance capacitor 8 into a voltage corresponding to the current value. When the voltage indicative of the value of electric current flowing through resonance capacitor 8 exceeds a reference voltage $V_{ref}$ of normal power source 29, comparator 28 produces the output. When discharge action decreases charged voltage on regulatory capacitor 30 to low level threshold $V_L$ at a point $t_1$ as shown in FIG. 16(a), comparator 33 produces the output of high voltage level to AND gate 45 and set terminal S of RSFF 58 as shown in FIG. 16(b) to turn to and keep RSFF 58 in the set condition. At this moment, if the voltage indicative of electric current through resonance capacitor 8 has not yet reached reference voltage $V_{ref}$, comparator 28 produces no output. Accordingly, during the period of time from point $t_1$ to $t_2$, both of first and second switches 31a and 32a are kept off, while maintaining the voltage level at location a because there is neither charge nor discharge current for regulatory capacitor 30.

Then, when the voltage indicative of electric current through regulatory capacitor 8 reaches a level of reference voltage $V_{ref}$ at point $t_2$, comparator 28 produces the output to reset RSFF 58 which then generates the output of high voltage level from Q bar terminal. Therefore, AND gate 45 produces the output of high voltage level to switch the output of first inverter 34 to low voltage level so that trailing edge of the output from first inverter 34 triggers timer 93 to produce the output and set a dead time, and then, AND gate 37 produces the output of low voltage level to turn second MOS-FET 4 off. This ceases resonance current through resonance capacitor 8, and at the same time, regulatory capacitor 30 starts next charging. In this case, as comparator 33 produces the output of high voltage level, RSFF 58 is shifted to the set condition at the instant of termination of resonance current so that RSFF 58 stops the output; first inverter 34 and then AND gate 36 produce their outputs of high voltage level to turn first MOS-FET 3 on at the end of dead time by timer 93.

In this way, comparator 28 can detect resonance current at a specific level to turn first and second MOS-FETs 3 and 4 on and off to delay charging and discharging of regulatory capacitor 30 until resonance current comes to a predetermined value for soft switching. In this regard, voltage across second MOS-FET 4 during the resonance indicates a voltage resonance waveform resulted mainly from voltage resonance capacitor 6 and primary winding 9a of transformer 9. On-time control circuit 21 of FIG. 15 can adapt charging and discharging action of regulatory capacitor 30 to times suitable for voltage resonance to take positive voltage and current resonance action.

The embodiments of the present invention may be varied in various ways without limitation to the foregoing embodiments. For example, in lieu of MOS-FETs (MOS type field effect transistors), first and second switching elements 3 and 4 may include various kind of switch elements such as bipolar transistors, IGBT (Insulated Gate Bipolar Transistor), JFET (Junction Type Field Effect Transistor) or thyristors. Also, in frequency control circuit 23 shown in FIGS. 8 and 15, in place of timer 93, two timers not shown may be connected to each input terminal of OR gate 92 so that these timers receive trailing edges of the output from comparator 33 or first inverter 34 to produce the outputs from the timers to third inverter 94.

What is claimed are:

1. A switching power source device of resonance type comprising: a DC power source; first and second switching elements connected in series to the DC power source; a primary winding of a transformer connected in parallel to one of the first and second switching elements; a resonance capacitor for forming a series circuit together with the primary winding of the transformer; a rectifying smoother connected to a second winding of the transformer for supplying DC power to a load; an output voltage detector for detecting output voltage on the load to produce a detection signal; and a control circuit for applying on-off signals to each control terminal of the first and second switching elements in response to the detection signal from the output voltage detector;

wherein said control circuit comprises a frequency control circuit for controlling the on-off operation of the first and second switching elements in response to the level of detection signal from output voltage detector to decide the switching frequency;

said frequency control circuit comprises an on-time control circuit which reduces the on-span of one of first and second switching elements more during the light load period in response to the level of detection signal from the output voltage detector than during the non-light load period to control power consumption, and a regulatory capacitor for determining the on-period of the first and second switching elements;

said on-time control circuit comprises charging and discharging circuits for charging and discharging the regulatory capacitor;

said charging circuit increases charge current toward the regulatory capacitor to shorten the charge time during the light load period, thereby causing the on-time control circuit to reduce the on-period of one of the first and second switching elements more than during the non-light load period; and said discharging circuit decreases discharge current from the regulatory capacitor to expand the discharge time during the light load period, thereby causing the on-time control circuit to extend the on-period of the other of the first and second switching elements more than during the non-light load period.

2. A switching power source device of claim 1, further comprising a series circuit which includes a resonance reactor, primary winding of the transformer and the resonance capacitor, said series circuit being connected in parallel to the other of said first and second switching elements.

3. A switching power source device of claim 2, wherein said frequency control circuit controls the control circuit to extend the on-span of the first or second switching element more during the light load period than one cycle of resonance frequency by the resonance reactor and capacitor.

4. A switching power source device of claim 1, wherein said frequency control circuit controls the control circuit to produce switching signals of a substantially same time length to the first and second switching elements during the non-light load condition.

5. A switching power source device of resonance type comprising: a DC power source; first and second switching elements connected in series to the DC power source; a primary winding of a transformer connected in parallel to one of the first and second switching elements; a resonance capacitor for forming a series circuit together with the primary winding of the transformer; a rectifying smoother connected to a second winding of the transformer for supplying DC power to a load; an output voltage detector for detecting output voltage on the load to produce a detection signal; and a control circuit for applying on-off signals to each control terminal of the first and second switching elements in response to the detection signal from the output voltage detector;

wherein said control circuit comprises a frequency control circuit for controlling the on-off operation of the first and second switching elements in response to the level of detection signal from output voltage detector to decide the switching frequency;

said frequency control circuit comprises an on-time control circuit which reduces the on-span of one of first and second switching elements more during the light load period in response to the level of detection signal from the output voltage detector than during the non-light load period to control power consumption, and a regulatory capacitor for determining the on-period of the first and second switching elements;

said on-time control circuit comprises charging and discharging circuits for charging and discharging the regulatory capacitor;

said charging circuit increases charge current toward the regulatory capacitor to shorten the charge time during the light load period, thereby causing the on-time control circuit to reduce the on-period of one of the first and second switching elements more than during the non-light load period;

said discharging circuit decreases discharge current from the regulatory capacitor to expand the discharge time during the light load period, thereby causing the on-time control circuit to extend the on-period of the other of the first and second switching elements more than during the non-light load period; and discharge current from the regulatory capacitor through the discharging circuit may be expressed as a function of charge current to the regulatory capacitor so that the discharge current decreases with increase in the charge current.

6. A switching power source device of resonance type comprising: a DC power source; first and second switching elements connected in series to the DC power source; a primary winding of a transformer connected in parallel to one of the first and second switching elements; a resonance capacitor for forming a series circuit together with the primary winding of the transformer; a rectifying smoother connected to a second winding of the transformer for supplying DC power to a load; an output voltage detector for detecting output voltage on the load to produce a detection signal; and a control circuit for applying on-off signals to each control terminal of the first and second switching elements in response to the detection signal from the output voltage detector;

wherein said control circuit comprises a frequency control circuit for controlling the on-off operation of the first and second switching elements in response to the level of detection signal from output voltage detector to decide the switching frequency;

said frequency control circuit comprises an on-time control circuit which reduces the on-span of one of first and second switching elements more during the light load period in response to the level of detection signal from the output voltage detector than during the non-light load period to control power consumption, and a regulatory capacitor for determining the on-period of the first and second switching elements;

said on-time control circuit comprises charging and discharging circuits for charging and discharging the regulatory capacitor;

said charging circuit increases charge current toward the regulatory capacitor to shorten the charge time during the light load period, thereby causing the on-time control circuit to reduce the on-period of one of the first and second switching elements more than during the non-light load period;

said discharging circuit decreases discharge current from the regulatory capacitor to expand the discharge time during the light load period, thereby causing the on-time control circuit to extend the on-period of the other of the first and second switching elements more than during the non-light load period; and said charging circuit comprises a current mirror circuit provided with an electrifying DC power source for supplying electric current to said regulatory capacitor in response to the level of current flowing through said output voltage detector.

7. A switching power source device of resonance type comprising: a DC power source; first and second switching elements connected in series to the DC power source; a primary winding of a transformer connected in parallel to one of the first and second switching elements; a resonance capacitor for forming a series circuit together with the primary winding of the transformer; a rectifying smoother connected to a second winding of the transformer for supplying DC power to a load; an output voltage detector for detecting output voltage on the load to produce a detection signal; and a control circuit for applying on-off signals to each control terminal of the first and second switching elements in response to the detection signal from the output voltage detector;

wherein said control circuit comprises a frequency control circuit for controlling the on-off operation of the first and second switching elements in response to the level of detection signal from output voltage detector to decide the switching frequency;

said frequency control circuit comprises an on-time control circuit which reduces the on-span of one of first and second switching elements more during the light load period in response to the level of detection signal from the output voltage detector than during the non-light load period to control power consumption, and a regulatory capacitor for determining the on-period of the first and second switching elements;

said on-time control circuit comprises charging and discharging circuits for charging and discharging the regulatory capacitor;

said charging circuit increases charge current toward the regulatory capacitor to shorten the charge time during the light load period, thereby causing the on-time control circuit to reduce the on-period of one of the first and second switching elements more than during the non-light load period;

said discharging circuit decreases discharge current from the regulatory capacitor to expand the discharge time during the light load period, thereby causing the on-time control circuit to extend the on-period of the other of the first and second switching elements more than during the non-light load period; and said frequency control circuit comprises a primary current detector for detecting resonance current flowing through the primary winding of the transformer to produce a detection signal when the resonance current exceeds a predetermined value; and a time control circuit for controlling at least one of charge and discharge times for the regulatory capacitor in response to the detection signal from the primary current detector.

8. A switching power source device of resonance type comprising: a DC power source; first and second switching elements connected in series to the DC power source; a primary winding of a transformer connected in parallel to one of the first and second switching elements; a resonance capacitor for forming a series circuit together with the primary winding of the transformer; a rectifying smoother connected to a second winding of the transformer for supplying DC power to a load; an output voltage detector for detecting output voltage on the load to produce a detection signal; and a control circuit for applying on-off signals to each control terminal of the first and second switching elements in response to the detection signal from the output voltage detector;

wherein said control circuit comprises a frequency control circuit for controlling the on-off operation of the first and second switching elements in response to the level of detection signal from output voltage detector to decide the switching frequency;

said frequency control circuit comprises an on-time control circuit which reduces the on-span of one of first and second switching elements more during the light load period in response to the level of detection signal from the output voltage detector than during the non-light load period to control power consumption, and a regulatory capacitor for determining the on-period of the first and second switching elements;

said on-time control circuit comprises charging and discharging circuits for charging and discharging the regulatory capacitor;

said charging circuit increases charge current toward the regulatory capacitor to shorten the charge time during the light load period, thereby causing the on-time control circuit to reduce the on-period of one of the first and second switching elements more than during the non-light load period;

said discharging circuit decreases discharge current from the regulatory capacitor to expand the discharge time during the light load period, thereby causing the on-time control circuit to extend the on-period of the other of the first and second switching elements more than during the non-light load period;

said charging circuit comprises a first current mirror circuit for charging the regulatory capacitor; and said discharging circuit comprises a second current mirror circuit for discharging the regulatory capacitor.

* * * * *